April 24, 1934.  W. S. FISHER  1,956,015
VIBRATION DAMPING DEVICE
Filed March 12, 1931
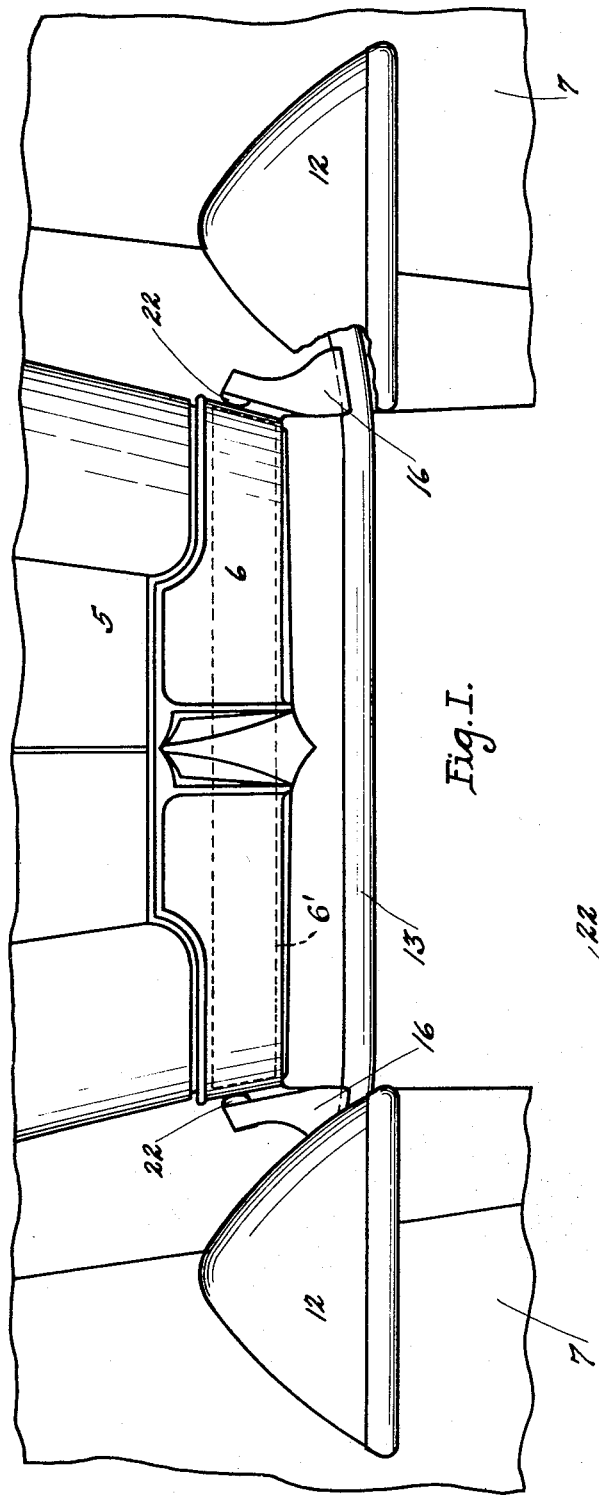
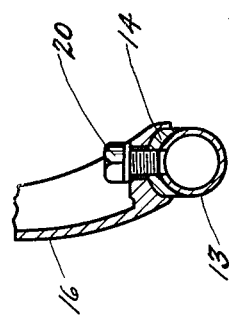
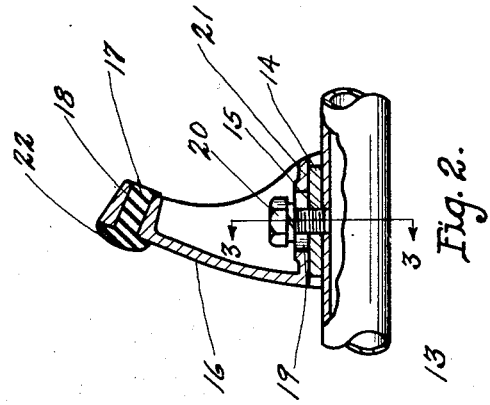
INVENTOR.
WALTER S. FISHER
BY Chester H. Braselton
ATTORNEY Patented Apr. 24, 1934

1,956,015

UNITED STATES PATENT OFFICE 1,956,015

VIBRATION DAMPING DEVICE

Walter Scott Fisher, Toledo, Ohio, assignor to The Willys-Overland Company, Toledo, Ohio, a corporation of Ohio Application March 12, 1931, Serial No. 521,975

8 Claims. (Cl. 280—150)

This invention relates to vibration damping devices and more particularly to devices for reducing or eliminating vibratory movements of elements of automotive vehicles.

The invention contemplates the provision of a vibration damping device or snubber, one purpose of which is to reduce the relative movement between a vehicle radiator and other elements of the vehicle structure as, for example, the headlamp supporting member and associated parts.

The invention has for an object the provision of a device of this character in which the snubber supports can be readily adjusted.

Another object of the invention is to provide snubber brackets for vehicle radiator shells that are inexpensive and will facilitate their installation in production.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

Figure 1 is a fragmentary top plan view showing the front portion of an automotive vehicle illustrating one form of snubbing device.

Figure 2 of my invention is a fragmentary detail sectional view of one of the radiator snubber brackets particularly illustrating the method of securing the same to the headlamp supporting means, Figure 3 is a vertical sectional view taken substantially on line 3—3 of Figure 2.

While I have illustrated the device of my invention as incorporated in an automotive vehicle and as illustrated for the purpose of damping the lateral vibratory movement of a vehicle radiator and its shell, it is to be understood that I contemplate the incorporation of the device of my invention in any structure where the same may be found to be applicable.

Referring to the drawing in detail, the numeral 5 designates the front portion of an automotive vehicle comprising a radiator shell 6 which encloses the usual radiator core 6' secured to the frame (not shown) in the usual manner, fenders 7 and headlamps 12. The headlamps 12 are preferably fixedly mounted one on each fender and are rigidly held against relative movement by means of a bracing or tie rod 13, which is illustrated as parallel with the plane of the radiator shell 6. The tie rod 13 is preferably formed of thin walled tubing and spaced therealong at points adjacent either side of the radiator shell 6 is a reinforcing member 14 of segmental cross-section which is welded or otherwise fixedly secured to the exterior wall of the tubing 13.

Each radiator snubber bracket 16 is preferably of hollow formation having a curved portion 21 adapted to coincide with and engage the exterior wall of the member 14. The member 14 is provided with a threaded opening 15 adapted to receive a retaining member or cap screw 20 which passes through an elongated slot 19 in the portion 21 of bracket 16, the cap screw 20 serving to retain the bracket 16 in adjusted position with respect to the tube 13 and the radiator shell 6. The extremity of each bracket 16 is provided with an opening 18 adapted to receive a tenon 17 of a resilient member or button 22 which may be fabricated of caoutchou or other pliable or resilient material. By manipulation of the screw 20, the brackets 16 may be adjusted relative to the support or bracing member 13 to positions wherein the resilient members 22 will be brought into engagement with the side walls of the radiator shell 6 in which position brackets may be fixedly secured by tightening the screws 20. Thus it will be seen that lateral vibratory movement of the radiator and its shell 6, caused by road irregularities over which the vehicle travels or which may arise from secondary harmonic out-of-balance condition of the motor, will be greatly damped or eliminated entirely. This is a particularly advantageous device when used with vehicles having radiators of extreme vertical dimensions as the structure of my invention hereinbefore described substantially reduces or eliminates to a great extent the annoying vibratory movement of the vehicle radiator and shell.

It is apparent that, within the scope of the invention modifications and different arrangements may be made other than is herein disclosed, and the present disclosure is illustrative merely, the invention comprehending all variations thereof.

What I claim is:

1. The combination with an automotive vehicle comprising a radiator having an enclosing shell; an elongated suppport positioned adjacent the radiator shell; a plurality of brackets carried by said support, said brackets having resilient members in engagement with lateral walls of said radiator shell.

2. A means for damping vibration of a vehicle radiator and its enclosing shell comprising a support; a bracket adjustably carried by said support; a resilient member mounted on said bracket; and means for fixedly securing said bracket in adjusted position to retain said resilient member in engagement with the radiator shell.

3. A vibration damping means for a radiator and its shell of an automotive vehicle comprising a supporting member; a pair of brackets adjustably carried by the supporting member; resilient members carried by said brackets and adapted to engage each lateral wall of the radiator shell, the parts being so arranged that the relative movement between the radiator and the supporting member is substantialy reduced.

4. In combination with an automotive vehicle, a radiator having an enclosing shell; a supporting member; a pair of brackets adjustably mounted upon said member; and resilient elements carried by the ends of said brackets and adapted for engagement with the radiator shell.

5. In combination, a vehicle radiator having an enclosing shell; a supporting member; a plurality of brackets mounted upon said member, said brackets being capable of longitudinal movement therealong; means for securing said brackets in adjusted position comprising threaded openings in said member, slots in said brackets, said openings and slots adapted to accommodate threaded means for holding said brackets in adjusted position in engagement with the radiator shell.

6. In combination, a vehicle radiator having an enclosing shell; a hollow supporting member, said member having reinforced walls at spaced points therealong; brackets supported by the reinforced portions of said member, said brackets adapted to engage the walls of said radiator shell to reduce lateral vibratory movement thereof; and threaded means for securing said brackets to said member in adjusted position.

7. The combination of a motor vehicle radiator having an enclosing shell; a support adjacent said radiator; and means for reducing lateral motion of said radiator and shell including members fixedly secured to the support and engageable with the lateral walls of said radiator shell.

8. The combination with an automotive vehicle comprising a radiator having an enclosing shell; a bracing member adjacent said radiator, means for reducing lateral movement of said radiator and shell comprising a plurality of brackets adjustably secured to said bracing member, and elements formed of resilient material carried by said brackets and engageable with the lateral walls of said radiator shell.

WALTER SCOTT FISHER.